United States Patent
Eichner et al.

(10) Patent No.: US 10,557,420 B2
(45) Date of Patent: Feb. 11, 2020

(54) FRESH AIR SUPPLY DEVICE FOR AN INTERNAL COMBUSTION ENGINE OF A MOTOR VEHICLE

(71) Applicant: Mahle International GmbH, Stuttgart (DE)

(72) Inventors: Jochen Eichner, Stuttgart (DE); Daniel Schatz, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 16/081,411

(22) PCT Filed: Mar. 3, 2017

(86) PCT No.: PCT/EP2017/055038
§ 371 (c)(1),
(2) Date: Aug. 30, 2018

(87) PCT Pub. No.: WO2017/149134
PCT Pub. Date: Sep. 8, 2017

(65) Prior Publication Data
US 2019/0345877 A1     Nov. 14, 2019

(30) Foreign Application Priority Data
Mar. 3, 2016 (DE) .......................... 10 2016 203 517

(51) Int. Cl.
*F02D 9/00* (2006.01)
*F02D 9/10* (2006.01)
(Continued)

(52) U.S. Cl.
CPC .......... *F02D 9/104* (2013.01); *F02B 27/0273* (2013.01); *F02D 9/106* (2013.01);
(Continued)

(58) Field of Classification Search
CPC ........ F02D 9/104; F02D 9/106; F02D 9/1065; F02D 9/1095; F02B 27/0273
See application file for complete search history.

(56) References Cited

U.S. PATENT DOCUMENTS 4,840,146 A * 6/1989 Yanagisawa .......... F02D 9/1095
123/184.38
4,907,547 A * 3/1990 Daly ................... F02B 27/0263
123/184.53

(Continued)

FOREIGN PATENT DOCUMENTS

DE     195 04 382 A1     8/1996
DE        10126063 A1    1/2003
(Continued)

OTHER PUBLICATIONS

English abstract for DE-101 46 750.
(Continued)

*Primary Examiner* — Thomas N Moulis
(74) *Attorney, Agent, or Firm* — Fishman Stewart PLLC

(57) ABSTRACT

A fresh air supply device for an internal combustion engine may include a housing and a flap arrangement arranged in the housing. The flap arrangement may include at least one flap for controlling a fresh air flow through a fresh air path to a respective cylinder of the internal combustion engine. The flap arrangement may include a common actuator shaft connected to the at least one flap in a torque-proof manner and mounted rotatably about an axis of rotation in a plurality of bearings of the flap arrangement. The actuator shaft may have at least one actuator shaft section in which the actuator shaft has a right-angle bend configured to interact with a stop present on the housing for limiting rotational movement of the actuator shaft.

20 Claims, 3 Drawing Sheets

(51) Int. Cl.
*F02B 27/02* (2006.01)
*F02D 9/02* (2006.01)

(52) U.S. Cl.
CPC .......... *F02D 9/1065* (2013.01); *F02D 9/1095* (2013.01); *F02D 2009/0216* (2013.01)

(56) References Cited

U.S. PATENT DOCUMENTS

| | | | |
|---|---|---|---|
| 5,696,318 A | 12/1997 | Ernst et al. | |
| 6,135,418 A * | 10/2000 | Hatton | F02D 9/1015 251/306 |
| 6,279,528 B1 * | 8/2001 | Happenhofer | F02B 27/02 123/184.44 |
| 8,739,761 B2 | 6/2014 | Chini | |
| 2002/0175308 A1 | 11/2002 | Leyendecker et al. | |
| 2007/0028891 A1 * | 2/2007 | Akagawa | F02D 9/1095 123/336 |
| 2010/0192893 A1 * | 8/2010 | Iwata | F01L 7/18 123/190.1 |

FOREIGN PATENT DOCUMENTS

| | | |
|---|---|---|
| DE | 101 46 750 A1 | 4/2003 |
| DE | 103 19 403 A1 | 12/2004 |
| DE | 103 30 225 A1 | 1/2005 |
| DE | 103 48 839 A1 | 6/2005 |
| DE | 102005029798 A1 | 1/2007 |
| DE | 10 2006 061 610 A1 | 7/2008 |
| DE | 10 2011 079 369 A1 | 1/2013 |
| EP | 2 557 298 A1 | 2/2013 |
| JP | H0797950 A | 4/1995 |
| JP | 2015-81510 A | 4/2015 |

OTHER PUBLICATIONS

English abstract for DE-103 30 225.
English abstract for DE-10 2006 061 610.
English abstract for DE-103 48 839.
English abstract for DE-103 19 403.
English abstract for DE-10 2011 079 369.
English abstract for JP-H0797950.
English abstract for JP-2015-081510.
Japanese office action dated Feb. 5, 2019.
English translation of Japanese office action dated Feb. 5, 2019.
European Office Action dated Oct. 15, 2019 for copending EP Application No. 17709629.4.
English Abstract for DE102005029798.

* cited by examiner

FRESH AIR SUPPLY DEVICE FOR AN INTERNAL COMBUSTION ENGINE OF A MOTOR VEHICLE

CROSS-REFERENCE TO RELATED APPLICATIONS

This application claims priority to International Patent Application No. PCT/EP2017/055038, filed on Mar. 3, 2017, and German Patent Application No. DE 10 2016 203 517.7, filed on Mar. 3, 2016, the contents of both of which are hereby incorporated by reference in their entirety.

TECHNICAL FIELD

The invention relates to a fresh air supply device for an internal combustion engine of a motor vehicle and an internal combustion engine with such a fresh air supply device.

BACKGROUND

Usually, a fresh air supply device for an internal combustion engine comprises a housing, which is arranged for mounting on a cylinder head of an internal combustion engine. In addition, a flap arrangement can be arranged in the housing, which, for cylinders of the internal combustion engine, has flaps for controlling a fresh air flow to the respective cylinder. Furthermore, it is basically possible that the flap arrangement comprises a common actuator shaft, which is connected to the flaps in a torque-proof manner and which is rotatably mounted about an axis of rotation in bearings of the flap arrangement.

SUMMARY

The present invention is concerned with the problem of indicating for a fresh air supply device an improved or at least a different embodiment, which is distinguished in particular by a simplified producibility and therefore also by reduced production costs.

This problem is solved by the subject matter of the independent claim(s). Preferred embodiments are the subject matter of the dependent claim(s).

It is accordingly a basic idea of the invention to provide an actuator shaft of a flap arrangement of a fresh air supply device with a right-angle bend, which interacts with a stop formed on the housing of the fresh air supply device, in order in this way to limit the rotational movement of the actuator shaft to the rotation angle range necessary for the correct mode of operation of the flap arrangement. The provision of a separate stop on the actuator shaft can be dispensed with in the fresh air supply device according to the invention with the right-angle bend, essential to the invention, which is described above. This leads to considerable cost savings in the production of the flap arrangement and therefore of the entire fresh air supply device.

A fresh air supply device for an internal combustion engine, according to the invention, comprises a housing and a flap arrangement arranged in the housing. The flap arrangement has, for cylinders of the internal combustion engine, at least one flap for controlling a fresh air flow through a fresh air path to the respective cylinder. The flap arrangement comprises a common actuator shaft, which is connected to the at least one flap in a torque-proof manner and which is rotatably mounted in bearings of the flap arrangement about an axis of rotation. According to the invention, the actuator shaft comprises at a distance from the at least one flap at least one actuator shaft section, in which the actuator shaft has a right-angle bend. The right-angle bend interacts with a stop, formed on the housing, for limiting the rotational movement of the actuator shaft.

In a preferred embodiment, the actuator shaft has at least one end position with respect to its rotational movement about the axis of rotation, in which end position the at least one actuator shaft section lies against the housing or against a component which is fixedly connected to the housing. In this configuration, the housing or respectively said component acts on the shaft section of the actuator shaft as a stop. In this way, the rotational movement of the actuator shaft can be limited suitably in the typically necessary manner to a particular rotation angle range of less than 360°.

Particularly preferably, the actuator shaft is adjustable between a closed position, in which the at least one flap closes the fresh air path, and an open position, in which the flap frees the fresh air path for through-flow with fresh air with a maximum flow cross-section. In this variant, by means of the actuator shaft, using the right-angle bend essential to the invention, the flow cross-section of the fresh air can be adjusted continuously between a zero value and a maximum value.

In an advantageous further development, the actuator shaft has a first end position with respect to its rotational movement about the axis of rotation, in which end position the shaft section lies against a first housing wall section of the housing. In this variant, the first end position is identical to the closed position or, alternatively thereto, it is identical to the open position. As in this variant a portion of the housing undertakes the function of a component acting as a stop on the right-angle bend of the shaft, the provision of a separate stop on the housing can be dispensed with. This simplifies the production of the fresh air supply device. In another variant, instead of the first housing wall section another component, in particular separate from the housing, can undertake the function of said stop. This permits the use of variously configured components as a stop.

In a further advantageous further development, the actuator shaft has with respect to its rotational movement about the axis of rotation a second end position, different from the first end position, in which second end position the at least one actuator shaft section lies against a second housing wall section of the housing. In this variant, the second end position is identical to the open position or, alternatively thereto, is identical to the closed position. This variant also simplifies the production of the fresh air supply device. In another variant, instead of the first housing wall section, another component, in particular separate from the housing, can undertake the function of said stop.

In another preferred embodiment, the fresh air duct has at least a first and a second surround in the region of the actuator shaft, wherein the second surround is arranged at a distance from the first surround. At least the first surround surrounds a flow cross-section which is controllable by the at least one flap. Here, the first actuator shaft section is arranged with the right-angle bend in a region between the two surrounds. In this variant, both surrounds delimit the fresh air duct, which preferably supplies a particular cylinder of the internal combustion engine with fresh air. By means of the first flap, the first flow cross-section can therefore be varied between a zero value and a maximum value. For the case where no flap is provided in the second surround, the second flow cross-section remains constant and therefore permits, irrespective of the rotation position of the actuator shaft which is set, the permanent provision of a constant "offset" of fresh air to the cylinders of the internal combustion engine.

Particularly expediently, the first and/or second housing wall section can be arranged between the two surrounds. In this variant, only a small amount of installation space is required for the provision of said stop.

An advantageous further develop requires particularly little installation space in which the first and/or second housing wall section connects the two surrounds with one another.

Particularly expediently, the two housing wall sections can form a 90° angle with one another. By means of this provision, the normally necessary right angle between the open and closed position can be realized in a technically simple manner.

A further preferred embodiment is associated with particularly low manufacturing costs, in which the two housing wall sections are formed integrally on the housing. This variant is recommended in particular when the housing is made from plastic and is to be produced by means of a plastic injection process.

In a further preferred embodiment, a virtual flap plane is defined by a position of the at least one flap in the closed position of the actuator shaft. In this variant, the first or the second housing wall section is arranged in this flap plane or in a plane which extends parallel to this flap plane. In this way, the fresh air supply device can be realized in a structurally simple manner, which can reduce to a not inconsiderable extent the liability to error of the fresh air supply device, in particular its flap arrangement.

In an advantageous further development, no flap is arranged in the at least one actuator shaft section.

In another preferred embodiment, the actuator shaft has at least one additional actuator shaft section with a right-angle bend, in the region of which the at least one flap is connected to the actuator shaft in a torque-proof manner. In this way, the flap can be fixed mechanically in a particularly stable and torque-proof manner on the shaft. Such a configuration of the shaft is particularly suitable in order to inject a flap, preferably made of plastic, onto the additional actuator shaft section. The right-angle bend in the additional actuator shaft section therefore serves for the arrangement of the flap of the flap arrangement and not to limit the rotational movement of the actuator shaft by interacting with a stop formed on the housing.

Particularly preferably, the actuator shaft is configured in one piece. This provision also involves low production costs for the fresh air supply device. The actuator shaft including the at least one flap can preferably be produced from a metal.

In a preferred embodiment, an axial direction is defined through the axis of rotation. In this embodiment, the actuator shaft section with the right-angle bend is an axial end section of the actuator shaft. This permits an arrangement of the right-angle bend and of the associated stop close to a drive device for adjusting the actuator shaft. Therefore, any mechanical failure of the actuator shaft in the region of the stop can be recognized particularly easily, because in this case all the flaps present on the actuator shaft are affected and can no longer be adjusted.

Particularly preferably, the fresh air supply device comprises a, preferably electrical, drive device, which is drivingly connected to a longitudinal end of the actuator shaft. The actuator shaft is connected in a torque-proof manner to at least two flaps, which are arranged at a distance from one another. The actuator shaft section with the right-angle bend is arranged axially between the longitudinal end of the actuator shaft and the flap axially adjacent to the drive device. In this way, any mechanical failure of the actuator shaft in the region of the stop can be recognized particularly easily.

The invention relates, furthermore, to an internal combustion engine with a fresh air supply device previously presented. The previously explained advantages of the fresh air supply device are therefore also transferred to the internal combustion engine.

Further important features and advantages of the invention will emerge from the subclaims, the drawings and the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
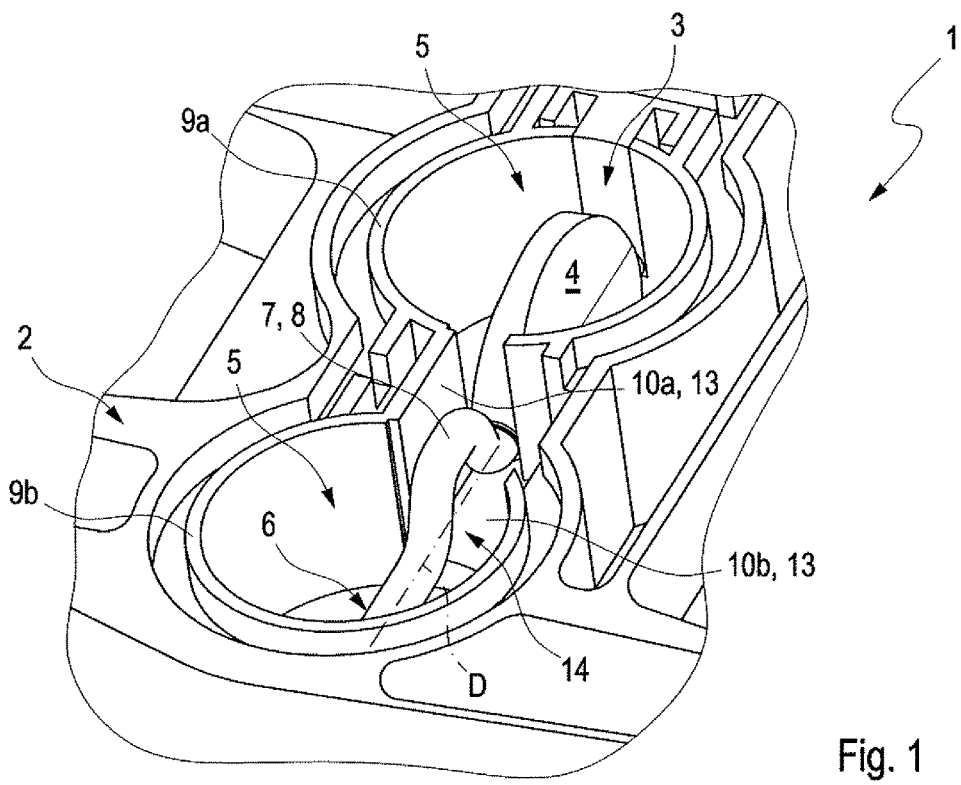
FIG. 1 an example of a fresh air supply device according to the invention, in which the actuator shaft is situated in a first end position, which corresponds to an open position of the flap, FIG. 2 the fresh air supply device of FIG. 1, wherein the actuator shaft is situated in a second end position, which corresponds to a closed position of the flap, FIG. 3 the arrangement of FIG. 1 in a view perpendicularly to an axis of rotation of the actuator shaft, FIG. 4 the arrangement of FIG. 2 in the view perpendicularly to the axis of rotation of the actuator shaft, FIG. 5 the flap arrangement of FIGS. 1 to 4 in separate illustration, FIG. 6 a variant of the flap arrangement of FIG. 4, in which several flaps are arranged on the actuator shaft.

FIG. 1 shows an example of a fresh air supply device 1 according to the invention, for an internal combustion engine which is not illustrated in further detail in the figures. The fresh air supply device 1 comprises a housing 2 and a flap arrangement 3 arranged in the housing 2. The flap arrangement 3 has the at least one flap 4 for cylinders of the internal combustion engine (not shown), for controlling a fresh air flow through a fresh air path 5 to the respective cylinder. The flap arrangement 3 comprises an actuator shaft 6 which is connected to the flap 4 in a torque-proof manner and which is mounted in bearings (not shown in the figures, for clarity) rotatably about an axis of rotation D on the housing 2. The actuator shaft 6 including the at least one flap 4 can preferably be produced from a metal.

As FIG. 1 shows, the actuator shaft 6 comprises an actuator shaft section 7, in which the actuator shaft 6 has a right-angle bend 8.

Figure 2:
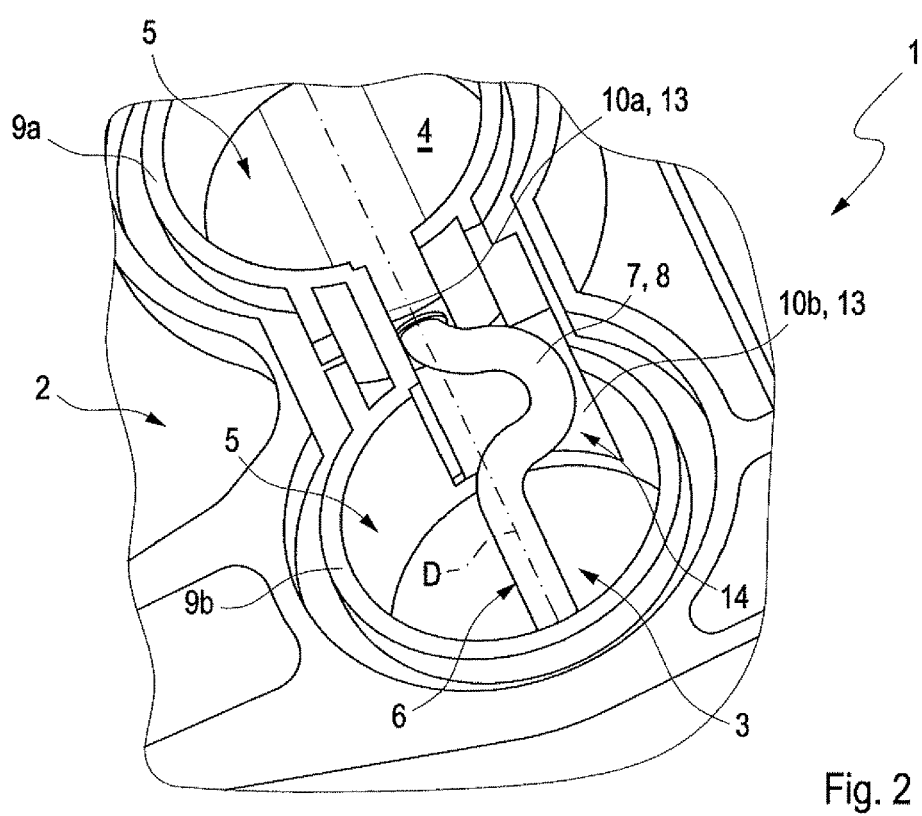

As FIGS. 1 and 2 show, no flap 4 is provided in the region of the actuator shaft section 7.

In accordance with FIG. 1, the fresh air path 5 has, in the region of the actuator shaft 6, a first and a second surround 9a, 9b, wherein the second surround 9b is arranged at a distance from the first surround 9a. The first surround 9a surrounds a flow cross-section which is controllable by the flap 4. The second surround 9b, on the other hand, surrounds a flow cross-section which is not able to be varied by a flap. As FIGS. 1 and 2 clearly demonstrate, the actuator shaft section 7 with the right-angle bend 8 is arranged in a region 14 of the housing 2 between the two surrounds 9a, 9b.

The actuator shaft 6 with the flap 4 is adjustable between an open position shown in FIG. 1 and a closed position illustrated in FIG. 2. In the open position according to FIG. 1, the flap 4 frees the fresh air path 5 for flowing through with fresh air with a maximum flow cross-section. In the closed position according to FIG. 2, the flap 4 closes the fresh air path 5 which is surrounded by the surround 9a.

The actuator shaft 6 has, with respect to its rotational movement about the axis of rotation D, a first end position and a second end position, different from the first end position, in which the shaft section lies against the housing 2 or against a component (not shown) which is fixedly connected to the housing. This means that the housing 2 or respectively the component acts as a stop 13 on the actuator shaft section 7 of the actuator shaft 6.

Figure 3:
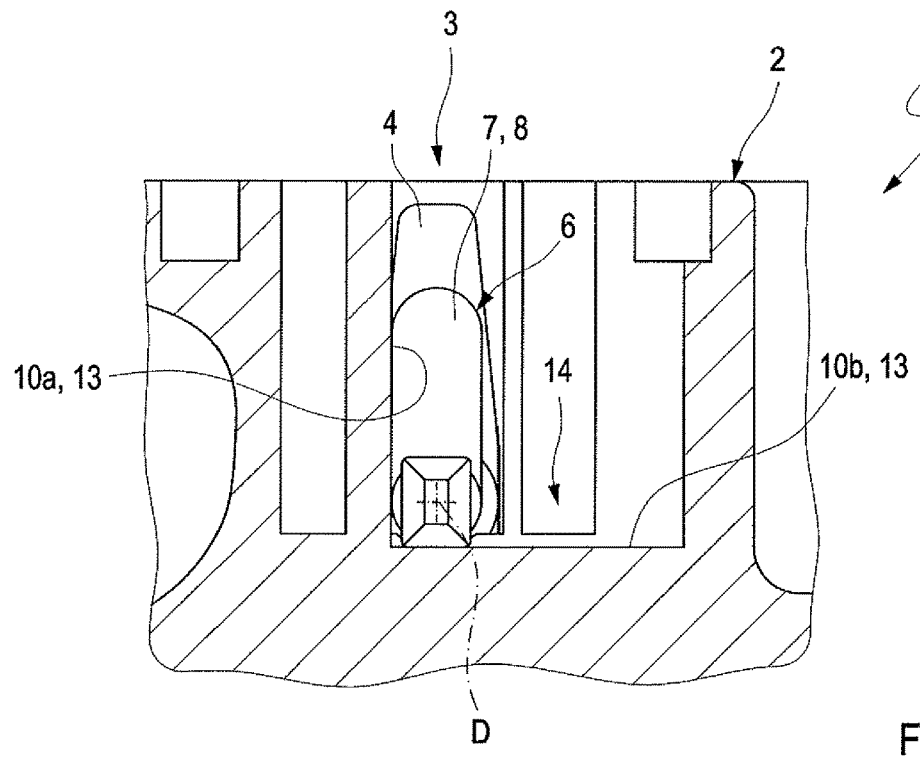

FIG. 1 shows the actuator shaft 6 in the first end position. In the first end position, the actuator shaft section 7 lies against a first housing wall section 10a of the housing. In the example of the figures, the first end position is identical to the open position of the actuator shaft 6. For clarification, FIG. 3 shows the arrangement of FIG. 1 in a view perpendicularly to the axis of rotation D of the actuator shaft 6.

Figure 4:
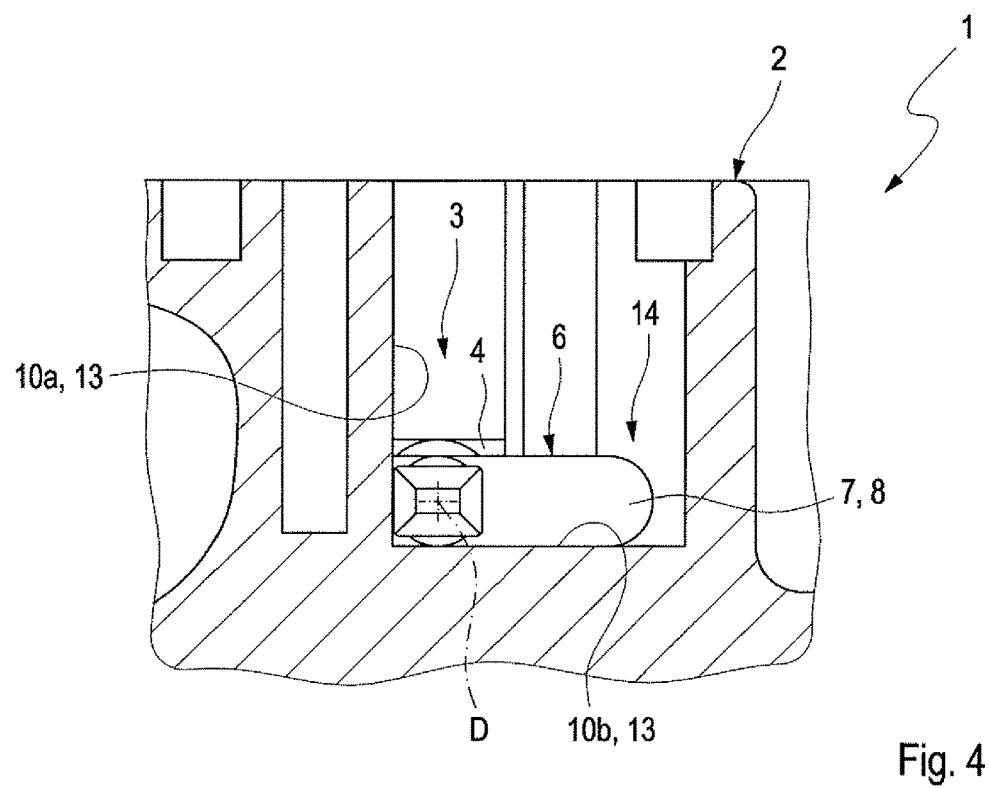

FIG. 2 shows the actuator shaft 6 in the second end position. In the second end position, the actuator shaft section 7 lies against a second housing wall section 10b of the housing 2, which is different from the first housing wall section 10a. In the example of the figures, the second end position is identical to the closed position of the actuator shaft 6. For clarification, FIG. 4 shows the arrangement of FIG. 2 in a view perpendicularly to the axis of rotation D of the actuator shaft 6.

In a variant, the first end position can also be identical to the closed position, and the second end position can be identical to the open position of the actuator shaft 6. Both the first and also the second housing wall section 10a, 10b are arranged laterally between the two surrounds 9a, 9b. In the example of FIGS. 1 and 2, the first and the second housing wall section 10a, 10b connect the two surrounds 9a, 9b to one another. The two housing wall sections are formed integrally on the housing 2 and form here a 90° angle to one another.

Through the position of the flap 4, shown in FIG. 2, in the closed position of the actuator shaft 6, a virtual flap plane is defined. The second housing wall section 10b is arranged in this virtual flap plane or in a plane arranged at a distance and parallel to this virtual flap plane.

Figure 5:
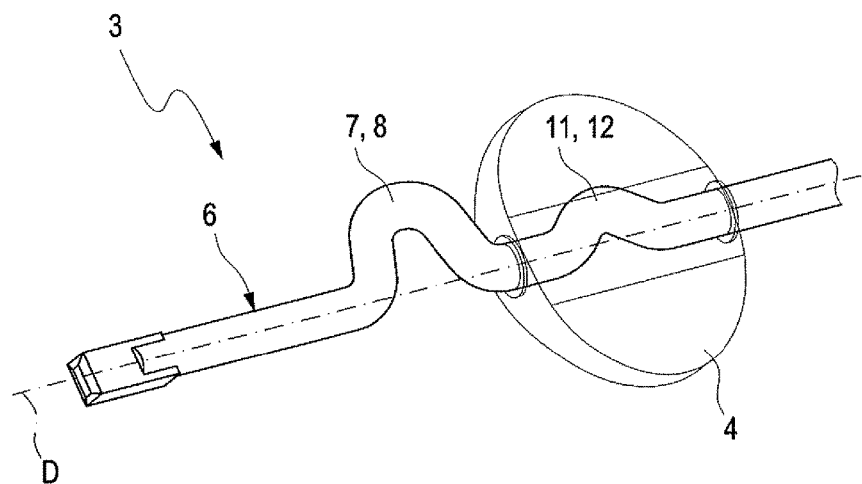

From FIG. 5, which shows the flap arrangement 3 with the actuator shaft 6 and with the flap 4 in separate illustration, it can be seen that the actuator shaft 6 has, in addition to the at least one actuator shaft section 7, an additional actuator shaft section 11, likewise with a right-angle bend 12, in the region of which the flap 4 is connected to the actuator shaft 6 in a torque-proof manner. Preferably, the actuator shaft 6 is configured in one piece and consists of a metal. The flap 4, made of plastic, is injected onto the actuator shaft 6, and namely in the region of the additional actuator shaft section 11, in which the right-angle bend 12 is present.

Figure 6:
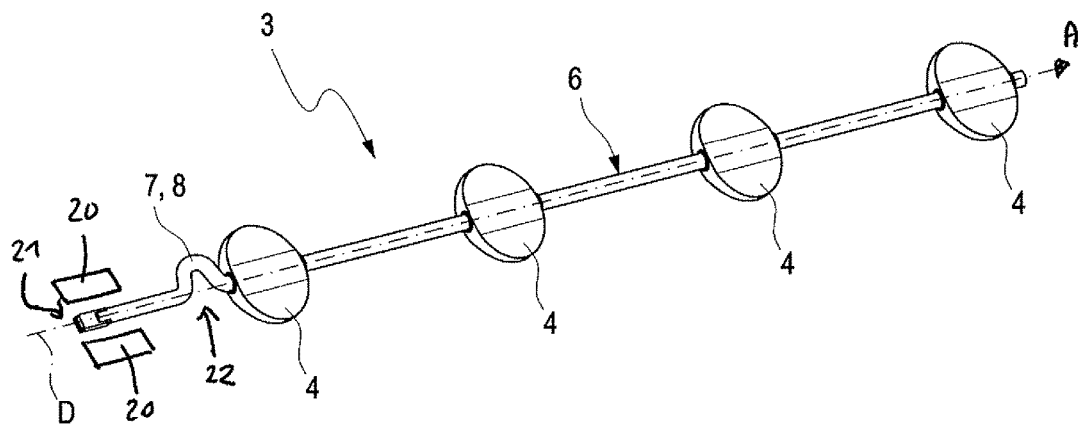

It can be seen from the flap arrangement 3 shown in FIG. 6 that not only a single flap 4 can be arranged on the actuator shaft 6, but rather—at a distance from one another—several flaps 4, which can serve respectively for controlling the flow cross-section of a respective fresh air path (not shown in FIG. 5).

As FIG. 6 shows, furthermore, an axial direction A is defined through the axis of rotation D. The actuator shaft section 7 with the right-angle bend 8 is accordingly an axial end section 22 of the actuator shaft 6. This permits an arrangement of the right-angle bend 8 and of the associated stop (not shown in FIG. 6) in the immediate vicinity of an electrical drive device 20—this is only indicated roughly diagrammatically in FIG. 6—for driving or respectively adjusting the actuator shaft 6. The actuator shaft section 7 with the right-angle bend 8 is arranged here axially between a longitudinal end 21 of the actuator shaft 6 and the flap 4 axially adjacent to the drive device 20. In this way, any mechanical failure of the actuator shaft 6 in the region of the stop 13 can be recognized particularly easily, because in this case all the flaps 4 present on the actuator shaft 4 are affected and can no longer be adjusted by means of the electrical drive device 20. This is particularly easy to detect.

The invention claimed is:

1. A fresh air supply device for an internal combustion engine, comprising:
    a housing and a flap arrangement arranged in the housing, the flap arrangement including at least one flap for controlling a fresh air flow through a fresh air path to a respective cylinder of the internal combustion engine;
    the flap arrangement including a common actuator shaft connected to the at least one flap in a torque-proof manner and mounted rotatably about an axis of rotation in a plurality of bearings of the flap arrangement; and
    the actuator shaft having at least one actuator shaft section in which the actuator shaft has a right-angle bend configured to interact with a stop present on the housing for limiting a rotational movement of the actuator shaft.

2. The fresh air supply device according to claim 1, wherein the actuator shaft, with respect to the rotational movement about the axis of rotation, has at least one end position, in which the at least one actuator shaft section with the right-angle bend lies against at least one of the housing and a component fixedly connected to the housing such that the at least one of the housing and the component define the stop.

3. The fresh air supply device according to claim 1, wherein the actuator shaft is adjustable to a closed position, in which the at least one flap closes the fresh air path, and an open position, in which the at least one flap frees the fresh air path for flowing through with fresh air with a maximum flow cross-section.

4. The fresh air supply device according to claim 3, wherein:
    the actuator shaft, with respect to the rotational movement about the axis of rotation, has a first end position, in which the at least one actuator shaft section lies against a first housing wall section of the housing; and
    the first end position is identical to one of the closed position and the open position.

5. The fresh air supply device according to claim 3, wherein:
    the actuator shaft, with respect to the rotational movement about the axis of rotation, has a second end position, in which the at least one actuator shaft section lies against a second housing wall section of the housing; and
    the second end position is identical to one of the open position and the closed position.

6. The fresh air supply device according to claim 1, wherein:
the fresh air path includes, in a region of the actuator shaft, at least a first surround and a second surrounds;
the second surround arranged at a distance from the first surrounds;
at least the first surround surrounds a flow cross-section controllable via the at least one flap; and
the at least one actuator shaft section with the right-angle bend is arranged in a region between the two surrounds.

7. The fresh air supply device according to claim 6, wherein at least one of a first housing wall section and a second housing wall section is arranged between the two surrounds.

8. The fresh air supply device according to claim 6, wherein at least one of a first housing wall section and a second housing wall section connects the two surrounds to one another.

9. The fresh air supply device according to claim 4, wherein the housing includes a second housing wall section, the two housing wall sections forming substantially a 90° angle to one another.

10. The fresh air supply device according to claim 4, wherein the housing includes a second housing wall section, the two housing wall sections integrally provided on the housing.

11. The fresh air supply device according to claim 3, wherein:
the at least one flap, when the actuator shaft is in the closed position, defines a virtual flap plane; and
one of a first housing wall section and a second housing wall section is arranged in one of the flap plane and a plane extending parallel to the flap plane.

12. The fresh air supply device according to claim 1, wherein the at least one flap is arranged outside of the at least one actuator shaft section.

13. The fresh air supply device according to claim 1, wherein the actuator shaft has at least one additional actuator shaft section with a right-angle bend, in a region of which the at least one flap is connected to the actuator shaft in a torque-proof manner.

14. The fresh air supply device according to claim 1, wherein the actuator shaft is provided as a single piece.

15. The fresh air supply device according to claim 1, wherein:
an axial direction is defined through the axis of rotation; and
the at least one actuator shaft section with the right-angle bend is an axial end section of the actuator shaft.

16. The fresh air supply device according to claim 1, further comprising drive device drivingly connected to a longitudinal end of the actuator shaft, wherein:
the actuator shaft is connected in a torque-proof manner to at least two flaps arranged at a distance from one another; and
the at least one actuator shaft section with the right-angle bend is arranged axially between the longitudinal end of the actuator shaft and a flap disposed axially adjacent to the drive device.

17. An internal combustion engine comprising a fresh air supply device including:
a housing and a flap arrangement arranged in the housing, the flap arrangement including at least one flap for controlling a fresh air flow through a fresh air path to a respective cylinder of the internal combustion engine;
the flap arrangement including a common actuator shaft connected to the at least one flap in a torque-proof manner and mounted rotatably about an axis of rotation in a plurality of bearings of the flap arrangement; and
the actuator shaft having at least one actuator shaft section in which the actuator shaft has a right-angle bend configured to interact with a stop present on the housing for limiting rotational movement of the actuator shaft.

18. The fresh air supply device according to claim 13, wherein the at least one flap is mounted on the at least one additional actuator shaft section.

19. The fresh air supply device according to claim 3, wherein:
the actuator shaft is rotatable to a first end position and a second end position;
the at least one actuator shaft section lies against a first housing wall section of the housing when the actuator shaft is in the first end position;
the at least one actuator shaft section lies against a second housing wall section of the housing when the actuator shaft is in the second end position;
the first end position is identical to one of the open position and the closed position; and
the second end position is identical to the other of the open position and the closed position.

20. A fresh air supply device for an internal combustion engine, comprising:
a housing and a flap arrangement arranged in the housing, the flap arrangement including at least one flap for controlling a fresh air flow through a fresh air path to a respective cylinder of the internal combustion engine;
the flap arrangement including a common actuator shaft connected to the at least one flap in a torque-proof manner and mounted rotatably about an axis of rotation in a plurality of bearings of the flap arrangement, the axis of rotation defining an axial direction;
the actuator shaft having at least one actuator shaft section in which the actuator shaft has a right-angle bend configured to interact with a stop present on the housing for limiting rotational movement of the actuator shaft;
the actuator shaft having at least one additional actuator shaft section with a right-angle bend; and
wherein the at least one actuator shaft section is an axial end section of the actuator shaft.

* * * * *